United States Patent
Al-Azzawe et al.

(10) Patent No.: US 7,322,022 B2
(45) Date of Patent: Jan. 22, 2008

(54) METHOD FOR CREATING WRAPPER XML STORED PROCEDURE

(75) Inventors: Abdul Al-Azzawe, Pleasant Hill, CA (US); Steffen Siegmund, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 743 days.

(21) Appl. No.: 10/236,890

(22) Filed: Sep. 5, 2002

(65) Prior Publication Data

US 2004/0049736 A1   Mar. 11, 2004

(51) Int. Cl.
*G06F 9/44* (2006.01)
*G06F 9/45* (2006.01)

(52) U.S. Cl. .................. 717/106; 717/117; 717/118; 715/513; 707/102

(58) Field of Classification Search ........ 717/106–119, 717/103, 172, 173; 707/1, 9, 10, 513, 102; 715/513
See application file for complete search history.

(56) References Cited

U.S. PATENT DOCUMENTS

| | | | |
|---|---|---|---|
| 5,875,332 A | 2/1999 | Wang et al. | |
| 6,636,845 B2* | 10/2003 | Chau et al. | 707/1 |
| 6,643,650 B1* | 11/2003 | Slaughter et al. | 707/10 |
| 6,725,446 B1* | 4/2004 | Hahn et al. | 717/103 |
| 6,789,077 B1* | 9/2004 | Slaughter et al. | 707/10 |
| 7,065,744 B2* | 6/2006 | Barker et al. | 717/109 |
| 7,191,431 B2* | 3/2007 | Brown et al. | 717/136 |
| 2001/0032218 A1 | 10/2001 | Huang | |
| 2001/0037337 A1 | 11/2001 | Stockley | |
| 2002/0016801 A1 | 2/2002 | Reiley et al. | |
| 2002/0100027 A1* | 7/2002 | Binding et al. | 717/137 |
| 2002/0152210 A1* | 10/2002 | Johnson et al. | 707/9 |
| 2002/0184266 A1* | 12/2002 | Blessin | 707/513 |
| 2003/0037311 A1* | 2/2003 | Busfield | 717/115 |

(Continued)

FOREIGN PATENT DOCUMENTS

CA   2255021   11/1998

(Continued)

OTHER PUBLICATIONS

Stroulia et al., Constructing XML-speaking wrappers for WEB applications: towards an interoperating WEB, IEEE, Nov. 23-25, 2000 pp. 59-68.*

(Continued)

*Primary Examiner*—Wei Zhen
*Assistant Examiner*—Satish S Rampuria
(74) *Attorney, Agent, or Firm*—Sawyer Law Group LLP

(57) ABSTRACT

A method for automatically generating code for converting data from stored procedures to an XML format is performed by a wizard with which a client interfaces. The wizard receives a selection of a stored procedure, determines an output data format for the selected stored procedure, obtains a definition of an XML document which contains which portions of the output data format to include in the XML document, and generates code for a wrapper. The wrapper would call the stored procedure and generate the defined XML document. The XML document is then returned by the wrapper. In this manner, the code for converting data to the XML format need not be manually generated. The data also need not be manually converted to the XML format.

28 Claims, 5 Drawing Sheets

U.S. PATENT DOCUMENTS

| | | | |
|---|---|---|---|
| 2003/0056198 A1 | 3/2003 | Al-Azzawe et al. | 717/127 |
| 2003/0172368 A1* | 9/2003 | Alumbaugh et al. | 717/106 |
| 2004/0015840 A1* | 1/2004 | Walker | 717/108 |
| 2004/0031015 A1* | 2/2004 | Ben-Romdhane et al. | 717/107 |
| 2005/0022115 A1* | 1/2005 | Baumgartner et al. | 715/513 |
| 2005/0204337 A1* | 9/2005 | Diesel et al. | 717/113 |

FOREIGN PATENT DOCUMENTS

| | | |
|---|---|---|
| EP | 1030254 | 8/2000 |
| JP | 2001-34618 | 7/1999 |
| JP | 2001-34619 | 7/1999 |
| WO | WO0167290 | 9/2001 |
| WO | WO0169375 | 9/2001 |

OTHER PUBLICATIONS

Lacroix, Scientific data integration: wrapping textual documents with a database view mechanism and an XML engine, IEEE, Nov. 8-10, 2000 pp. 71-76.*

Liu et al., XWRAP: an XML-enabled wrapper construction system for WEB information sources, IEEE, Feb. 29-Mar. 3, 2000 pp. 611-621.*

Google.com, XML wrapper Generator for IBM DB2, Google.com, Oct. 25, 2002, pp. 1-2.*

XML and DB2, Cheng, J.; Xu, J.; Data Engineering, 2000. Proceedings. 16th International Conference on, Feb. 29-Mar. 3, 2000, IEEE, pp. 569-573.*

XAS: a system for accessing componentized, virtual XML documents, Ming-Ling Lo; Shyh-Kwei Chen; Padmanabhan, S.; Jen-Yao Chung; Software Engineering, 2001, IEEE, Proceedings of the 23rd International Conference on, May 12-19, 2001, pp. 493-502.*

An automatic navigation scheme for XML documents through object-relational repository, Tseng, F.S.C.; Wen-Jong Hwung; Fei-Fei Cheng; Knowledge-Based Intelligent Engineering Systems and Allied Technologies, 2000. Proceedings. Fourth International Conference on, vol. 1, Aug. 30-Sep. 1, 2000, IEEE, pp. 428-431 vol. 1.*

A generic load/extract utility for data transfer between XML documents and relational databases, Bourret, R.; Bornhovd, C.; Buchmann, A.; Advanced Issues of E-Commerce and Web-Based Information Systems, 2000. WECWIS 2000. Second International Workshop on, Jun. 8-9, 2000, IEEE pp. 134-143.*

Wolfson, Dan et al., "Automatic Generation of Database Invocation Mechanism for External Web Services," U.S. Appl. No. 09/967,553, filed Sep. 28, 2001.

Sinn, Richard, SQL Access to System Specific Data, U.S. Appl. No. 09/567,959, filed May 9, 2000.

Cheng, Josephine et al, "XML and DB2," IBM Santa Teresa Laboratory, pp. 1-5.

Cheung, David, et al., "Distributed and Scalable XML Document Processing Architecture for E-Commerce Systems," IEEE 2000, pp. 1-6.

Erwig, Martin, "A Visual Language for XML," IEEE 2000, pp. 47-54.

Chow, Jyh-Herng et al., "Index Design for Structured Documents Based on Abstraction," IBM Santa Teresa Laboratory, pp. 1-8.

"Generating Java Code from an XML Schema with an XSL Stylesheet," Reasearch Disclosure, Jun. 2001, pp. 1036-1037.

"System for Paginating Markup in the Absence of Direct Feedback from an Output Device Context," Research Disclosure, Oct. 2001, pp. 1728.

Bertino, Elisa et al., "Integrating XML and Databases," IEEE Internet Computing, Jul./Aug. 2001, pp. 84-88.

Bourret, R. et al., "A Genetic Load/Extract Utility for Data Transfer Between XML Documents and Relational Databases," IEEE 2000, pp. 1-10.

Cheng, Josephine et al, "XML and DB2," IBM Santa Teresa Laboratory, pp. 1-5, date: unknown.

Chow, Jyh-Herng et al., "Index Design for Structured Documents Based on Abstraction," IBM Santa Teresa Laboratory, pp. 1-8, date: unknown.

Kurtzman, Stephen et al., "Design Goals of Object-Oriented Wrappers for theMach Microkernal," IEEE 1995, pp. 367-372.

Sneed, Harry M., "Wrapping Legacy COBOL Programs Behind an XML-Interface," IEEE 2001, pp. 189-197.

Quahid, H. et al., "Converting Web Pages into Well-Formed XML Documents," IEEE 1999, pp. 676-680.

Shinagawa, Norihide, et al., $X^2QL$: An eXtensible XML Query Language Supporting User-Defined Foreign Functions, Current Issues in Databases and Information Systems, Prague, Czech Republic, Sep. 5-9, 2000 Proceedings, pp. 252-264.

* cited by examiner

METHOD FOR CREATING WRAPPER XML STORED PROCEDURE

FIELD OF THE INVENTION

The present invention relates to stored procedures, and more particularly to the exchanging of data from stored procedures using XML.

BACKGROUND OF THE INVENTION

Extended Markup Language (XML) is a standard protocol for exchanging data between distributed applications or layers of the same application in a database system. Many of these applications access data by calling database stored procedures residing on a database server in the form of stored procedure output parameters or multiple result sets.

FIG. 1 illustrates a conventional database system. The database system includes an application server 102 and a database server 104. To access data, the application server 102 calls a stored procedure 106 residing on the database server 104. The stored procedure 106 returns data 108 in the form of stored procedure output parameters or multiple result sets. Since the stored procedure 106 does not understand XML, the returned data 108 is typically in some other format, such as the Structure Query Language (SQL) format. Code thus need to be manually generated which converts the SQL data 108 to XML data. The XML data can then be exchanged between application layers or between distributed applications.

However, the manual generation of code is cumbersome and time consuming, particularly when a large number of stored procedures are called. In addition, extra coding is required if the formatting of the XML data is to be optimized.

Accordingly, there exists a need for a method and system for automatically generating code for converting data from stored procedures to an XML format. The method and system should optimize the formatting of the data as well. The present invention addresses such a need.

SUMMARY OF THE INVENTION

A method for automatically generating code for converting data from stored procedures to an XML format is performed by a wizard with which a client interfaces. The wizard receives a selection of a stored procedure, determines an output data format for the selected stored procedure, obtains a definition of an XML document which contains which portions of the output data format to include in the XML document, and generates code for a wrapper. The wrapper would call the stored procedure and generate the defined XML document. The XML document is then returned by the wrapper. In this manner, the code for converting data to the XML format need not be manually generated. The data also need not be manually converted to the XML format.

DETAILED DESCRIPTION

The present invention provides a method and system for automatically generating code for converting data from stored procedures to an XML format. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 2 through 5 in conjunction with the discussion below.

Figure 1:
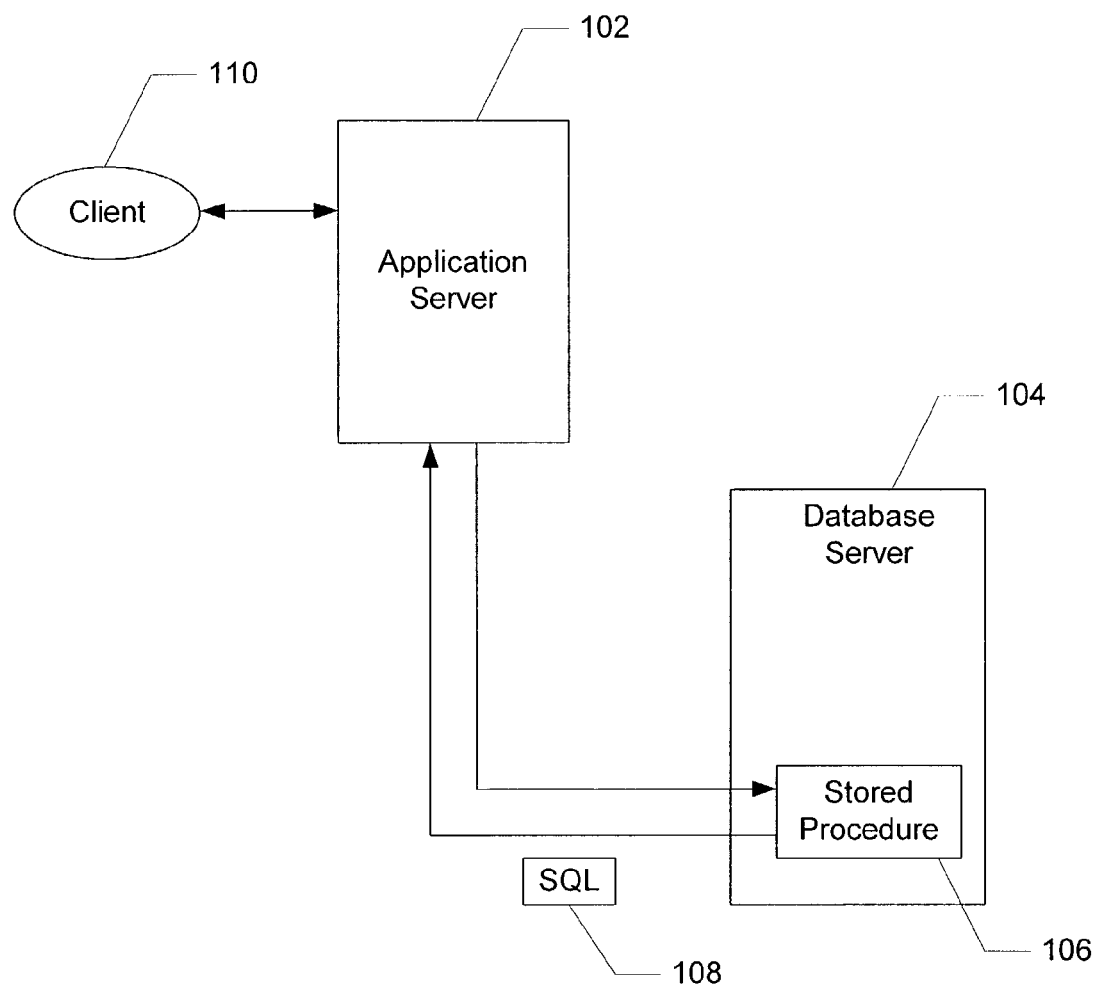
FIG. 1 illustrates a conventional database system.
Figure 2:
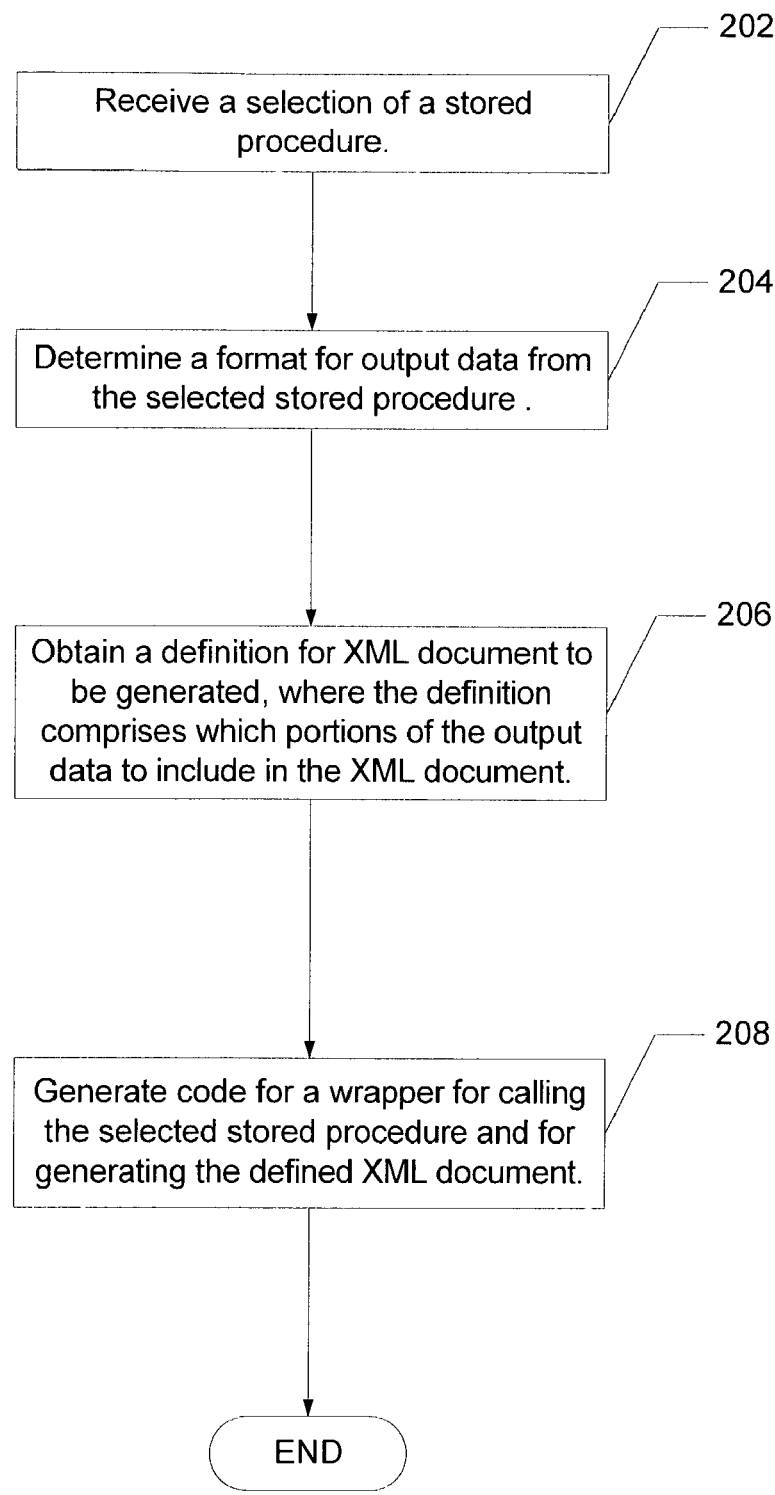
FIG. 2 is a flowchart illustrating a preferred embodiment of a method for automatically generating code for converting data from stored procedures to an XML format in accordance with the present invention.

FIG. 2 is a flowchart illustrating a preferred embodiment of a method for automatically generating code for converting data from stored procedures to an XML format in accordance with the present invention. In the preferred embodiment, the method steps are performed by a wizard with which a client interfaces. First, the wizard receives a selection of a stored procedure, via step 202. Next, the wizard determines the format for output data from the selected stored procedure, via step 204. The output data format includes the parameters and result sets for the selected stored procedure. Next, the wizard obtains a definition of an XML document to be generated, where the definition comprises which portions of the output data to include in the XML document, via step 206. In the preferred embodiment, the wizard obtains the definition from the client, who selects which parameters and result sets are to be included. Then, the wizard generates the code for a wrapper, via step 208. When the wrapper is subsequently invoked, the wrapper calls the selected stored procedure and generates the defined output XML document.

Figure 3:
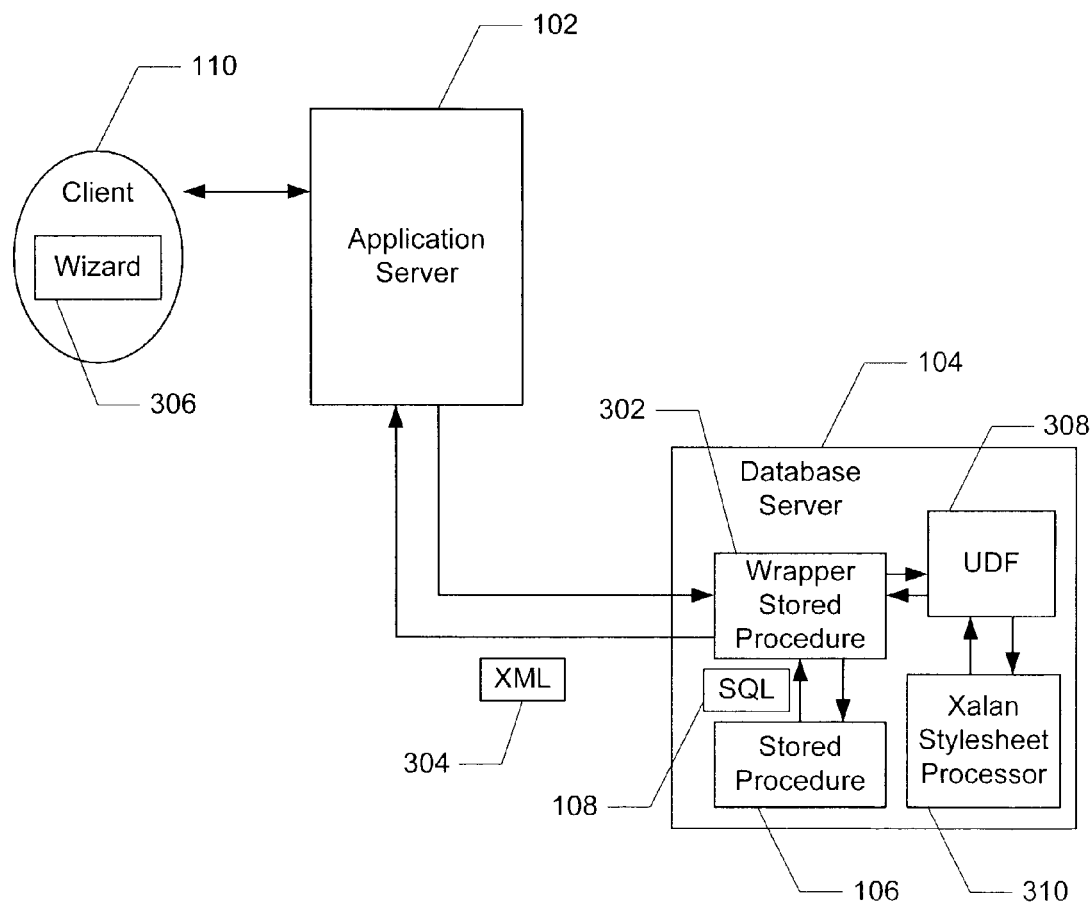
FIG. 3 illustrates a first preferred embodiment of a system for automatically generating code for converting data from stored procedures to an XML format in accordance with the present invention.

FIG. 3 illustrates a first preferred embodiment of a system for automatically generating code for converting data from stored procedures to an XML format in accordance with the present invention. The system comprises the application server 102 and the database server 104. At the database server 104 is a stored procedure 106. The client 110 interfaces with the wizard 306. The wizard 306 first receives a selection of the stored procedure 106, via step 202, from the client 110. Next, the wizard 306 determines a format for the output data from the selected stored procedure 106, via step 204. Next, the wizard 306 obtains from the client 110 a definition of the XML document to be generated, via step 206. The wizard 306 then generates the code for a wrapper stored procedure 302, via step 208. In the first preferred embodiment, the preferred language of the generated wrapper stored procedure 302 is Structured Query Language (SQL). Through the wizard 306, code for converting data from a stored procedure to the XML format is automatically generated. The client 110 is no longer required to manually code the wrapper or manually convert the data.

In the first preferred embodiment, the wizard 306 provides the client 110 with the option of merging and possibly aggregation of multiple result sets into the same XML document. The wizard 306 also provides the client 110 the option to mark one or more columns in a result set for the purpose of column aggregation. In aggregation, if subsequent rows in the same result set has the column values as the marked column, the remaining column in the row will be nested within the marked column. For example, if the result rows in a result set have movie title records and actor records, the movie title column can be marked for aggregation. This column would be defined as an XML node. For the subsequent result rows which has the same movie title value as the marked column, the actor columns are nested under the movie title node as subnodes. Thus, instead of unnecessarily repeating the movie title for each actor, the XML document groups the actors by movie title, resulting in a more efficient presentation of the data.

An application or application layer can then invoke the wrapper stored procedure 302 via the application server 102. The wrapper stored procedure 302 then calls the stored procedure 106. The stored procedure 106 returns one or more result sets as non-XML data, such as SQL data 108, to the wrapper stored procedure 302. The wrapper stored procedure 302 then converts the SQL data 108 into an XML document 304 according to the definition provided in step 206 of FIG. 2. The SQL data to XML data conversion is achieved through the use of text to XML conversion functions. SQL data types may be converted to text using standard to CHAR or to VARCHAR conversion functions. The text to XML conversion may be accomplished through user defined functions or standard SQLX functions to insert the required XML tags. Other methods of conversion are possible. Conversion functions are known in the art and will not be further described here.

For situations where the data is required to be transformed to another format, including other XML documents, a new User Defined Function (UDF) 308 can be provided at the database server 104 to transform the XML document into another data type. Conventionally, the client 110 is required to code an application to transform the XML document, and a client application had to perform the actual transformation. However, with this new UDF 308 in accordance with the present invention, the burden is removed from the client 110 and the client application. In the preferred embodiment, the transformation of the XML document can be done on the database server 104 by using the Xalan C++ stylesheet processor 310. The UDF 308 requires an XML document and the XSLT stylesheet 310. Any XML document in the database server 104 can be transformed by the UDF 308. It outputs the transformed document to a table of the database server 104, back to the wrapper 302, which then returned it back to the client 110. Alternatively, the transformed document is returns to the file system, where the transformed document can be accessed by additional applications.

Figure 4:
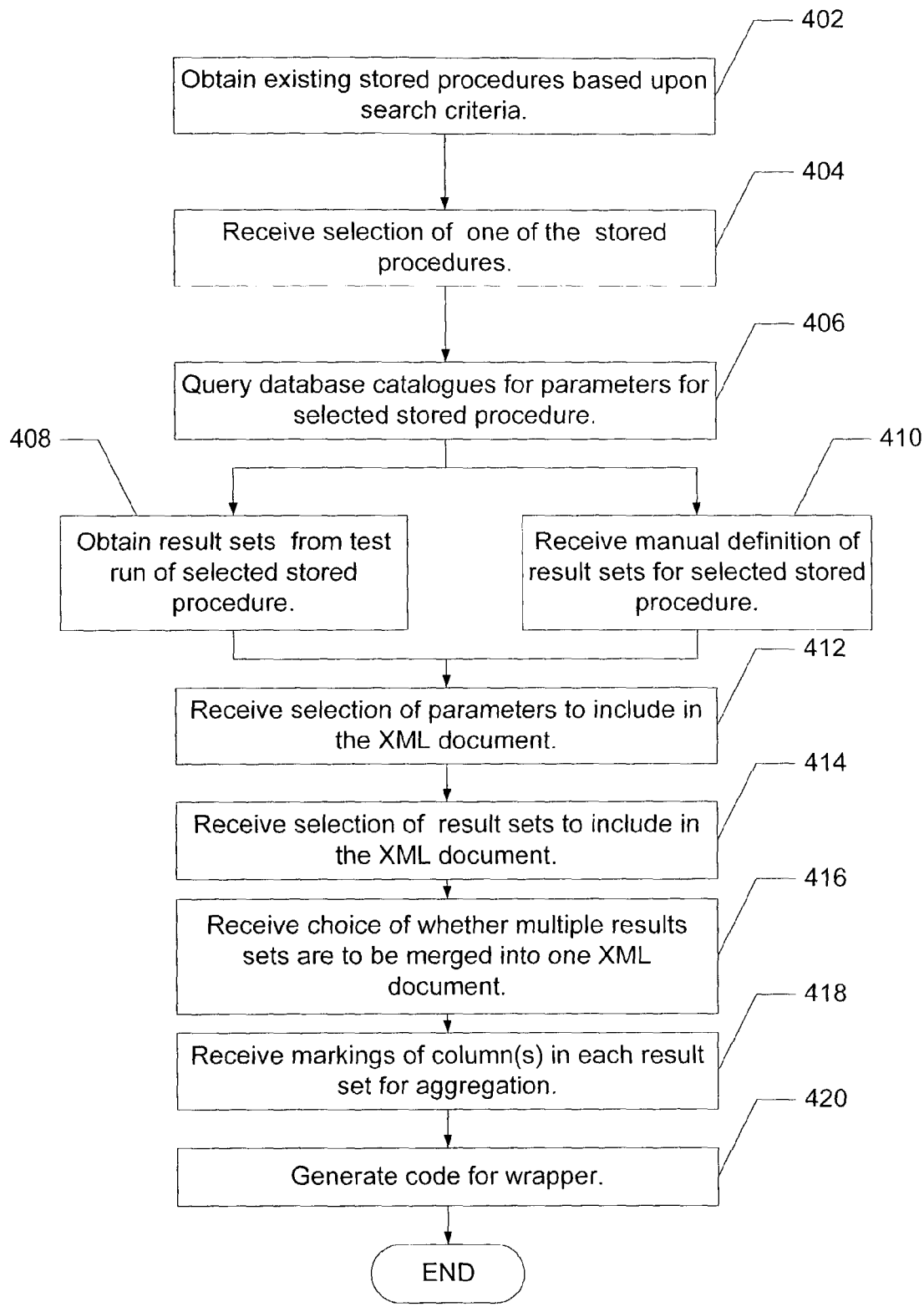
FIG. 4 is a flowchart illustrating in more detail the preferred embodiment of the method for automatically generating code for converting data from stored procedures to an XML format in accordance with the present invention.

FIG. 4 is a flowchart illustrating in more detail the preferred embodiment of the method for automatically generating code for converting data from stored procedures to an XML format in accordance with the present invention. First, the wizard 306 obtains from the client 110 search criteria for the existing stored procedures residing on the database server 104. The criteria can include which database schemas to consider, what the stored procedure name may be like, what the stored procedure language is, etc. The wizard 306 then obtains the list of existing stored procedures which meet the search criteria, via step 402. The wizard 306 next receives the selection from the client 110 of one of the stored procedures returned in the search, via step 404. Assume that stored procedure 106 was selected. Then, the wizard 306 queries the database catalogues (not shown) for the parameters for the selected stored procedure 106, via step 406. To obtain the result sets for the selected stored procedure 106, one of two methods may be used. The result sets may be obtained from a test run of the selected stored procedure 106, via step 408. However, performing the test run may be undesirable if the run has side-effects upon the database which cannot be undone with rollbacks. In this case, the client 110 may manually define the result sets, via step 410. In the manual definition, The client 110 specifies The number of result sets as well as the SQL type for each of the result set columns. Once the parameters and result sets are obtained, the wizard 306 receives a selection of the parameters, via step 412, and the result sets, via step 414, to include in the XML document to be generated. The client 110 may specify the XML node name for each parameter and each result set column. The wizard 306 may also receive a choice of whether multiple results sets are to be merged into one XML document, via step 416. The wizard 306 may also receive markings of the multiple result sets to be aggregated, using primary and foreign key columns of the multiple result sets. In addition, the client 110 can mark columns in each result set for aggregation, via step 418. Once steps 412 through 418 are performed, the wizard 306 has a definition of the XML document to be generated from the SQL data returned by the selected stored procedure 106. Prior to generation of the code, the client 110 may select the option to temporarily create the wrapper 302 and invoke it to view the generated XML document. The client 110 can thus validate the XML document definition prior to the actual creation of the wrapper stored procedure 302. Then, the wizard 306 generates the code for the wrapper stored procedure 302, via step 420, which will call the selected store procedure 106 and create the XML document as defined.

Figure 5:
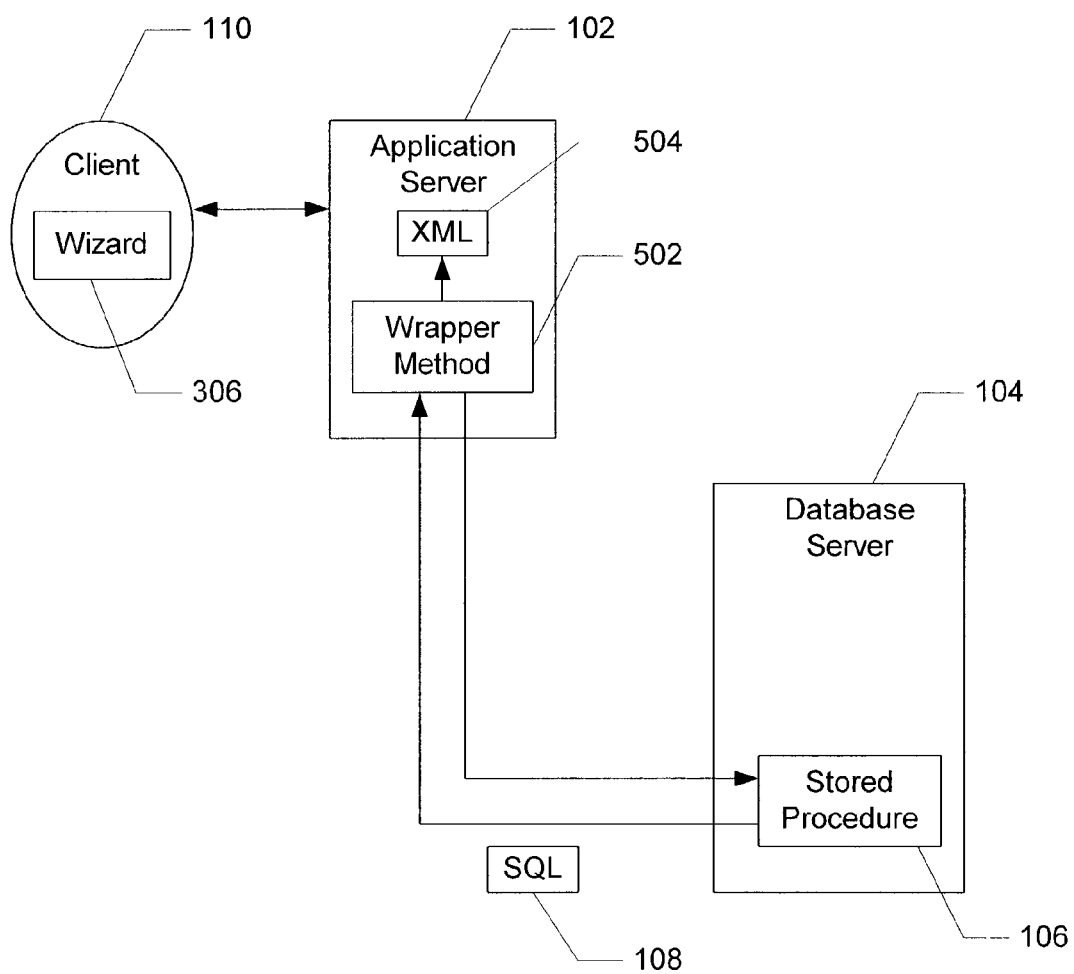
FIG. 5 illustrates a second preferred embodiment of a system for automatically generating code for converting data from stored procedures to an XML document in accordance with the present invention.

FIG. 5 illustrates a second preferred embodiment of a system for automatically generating code for converting data from stored procedures to an XML document in accordance with the present invention. In this system, code for a wrapper method 502 is generated by the wizard 306 instead of a wrapper stored procedure. The wrapper method 502 may reside at the database server 104, the application server 102, or some other intermediate machine (not shown). The wizard 306 generates code for the wrapper method 502 in the same manner as with the wrapper stored procedure 302, via steps 202-208 (FIG. 2). An application or application layer invokes the wrapper method 502 via the application server 102. The wrapper method 502 calls the stored procedure 106 residing at the database server 104. The stored procedure 106 returns SQL data 108 to the wrapper method 502. The wrapper method 502 converts the SQL data 108 into an XML document 504, and returns the XML document 504 to the application server 102. Any language may be used for generating code for the wrapper method 502, including C/C++, C#, Visual Basic, and Java. The text to XML conversion may be accomplished through the use of helper methods implemented using the same language as the generated wrapper method 502.

In a third preferred embodiment of a system for automatically generating code for converting SQL data from stored procedures to a data structure with nested arrays of structure, namely objects. This data structure is then converted into an efficient XML document by the application server 102 that will host the wrapper method that is exposed as a web service. The wizard 306 generates code for the wrapper method, which converts data sets into a data structure comprised of data objects. In the third preferred embodiment, the stored procedure 106 residing in the database server 104 is exposed as a web service using the generated wrapper method. The wrapper method converts the stored procedure output parameters and result sets into a data structure made up of data objects and arrays of possibly nested data objects. Using a web service generator tool, such as Microsoft Visual Studio. Net™, the wrapper method is exposed as a web service, and the data structure is converted to a SOAP payload reply, which is an XML document. This method yields superior performance and higher efficiency as compared with conventional methods of returning result sets as the output of the web service.

A method and system for automatically generating code for converting data from stored procedures to an XML format has been disclosed. The method is performed by a wizard with which a client interfaces. The wizard receives a definition of an XML document to be generated from output data from a stored procedure and generates the code for a wrapper. The wrapper would call the stored procedure and generate the defined XML document. The XML document is then returned by the wrapper. In this manner, the code for converting data to the XML format need not be manually generated. The data also need not be manually converted to the XML format.

Although the present invention has been described in accordance with the embodiments shown, one of ordinary skill in the art will readily recognize that there could be variations to the embodiments and those variations would be within the spirit and scope of the present invention.

Accordingly, many modifications may be made by one of ordinary skill in the art without departing from the spirit and scope of the appended claims.

What is claimed is:

1. A computer-implemented method for automatically generating code for converting data from stored procedures to an XML format, comprising the steps of:
   (a) providing a wizard for generating code for a wrapper method, wherein the wizard:
      (a1) receives a selection of a stored procedure, wherein the wizard receives a selection of a stored procedure including:
         (a1i) obtaining existing stored procedures base upon search criteria; the search criteria comprising: which database schemas to consider, what the stored procedure name may be, and what the stored procedure is;
      (a2) determines an output data format for the selected stored procedure, and
      (a3) obtains a definition of an Extended Markup Language (XML) document, wherein the definition comprises which portions of the output data format to include in the XML document; and
   (b) generating the code for the wrapper method by the wizard for calling the selected stored procedure and the selected stored procedure returns SQL data to the wrapper method, the wrapper method converts the returned SQL into the defined XML document.

2. The method of claim 1, wherein the determines step (a2) comprises:
   (a2i) determines parameters and result sets for the selected stored procedure.

3. The method of claim 2, wherein the determines step (a2i) comprises:
   (a2iA) queries database catalogues for the parameters for the selected stored procedure.

4. The method of claim 3, further comprising:
   (a2iB) obtains the result sets from a test run of the selected stored procedure.

5. The method of claim 3, further comprising:
   (a2iB) receives a manual definition of the result sets for the selected stored procedure.

6. The method of claim 1, wherein the obtains step (a3) comprises:
   (a3i) obtains a definition of the XML document, wherein the definition comprises parameters and result sets for the selected stored procedure to include in the XML document.

7. The method of claim 6, wherein the obtains step (a3i) comprises:
   (a3iA) receives a selection of parameters to include in the XML document; and
   (a3iB) receives a selection of result sets to include in the XML document.

8. The method of claim 7, further comprising:
   (a3iC) receives a choice of whether multiple result sets are to be merged into one XML document.

9. The method of claim 7, further comprising:
   (a3iC) receives a marking of multiple result set to be aggregated using primary and foreign key columns of the multiple result sets.

10. The method of claim 7, further comprising:
    (ai3C) receives a marking of a column in the selected result set for aggregation.

11. The method of claim 1, further comprising:
    (c) creating a user defined function to reside on a database server transforming the defined XML document to another data format.

12. The method of claim 11, wherein the another data format comprises another XML document.

13. The method of claim 1, wherein the wrapper converts output data front the selected stored procedure to a data structure comprising nested arrays of a structure, wherein the wrapper converts the data structure to the defined XML document.

14. The method of claim 13, wherein the data structure comprises nested arrays of objects.

15. A computer readable medium with program instructions tangibly stored thereon, the program instructions for automatically generating code for converting data from stored procedures to an XML format, the program instructions comprising instructions for:
    (a) providing a wizard for generating code for a wrapper method, wherein the wizard:
       (a1) receives a selection of a stored procedure, wherein the wizard receives a selection of a stored procedure including:
          (a1i) obtaining existing stored procedures base upon search criteria; the search criteria comprising: which database schemas to consider, what the stored procedure name may be, and what the stored procedure is;
       (a2) determines an output data format for the selected stored procedure, and
       (a3) obtains a definition of an Extended Markup Language (XML) document, wherein the definition comprises which portions of the output data format to include in the XML document; and (b) generating the code for the wrapper method by the wizard for calling the selected stored procedure and the selected stored procedure returns SQL data to the wrapper method, the wrapper method converts the returned SQL into the defined XML document.

16. The medium of claim 15, wherein the determines instruction (a2) comprises:
(a2i) determines parameters and result sets for the selected stored procedure.

17. The medium of claim 16, wherein the determines instruction (a2i) comprises:
(a2iA) queries database catalogues for the parameters for the selected stored procedure.

18. The medium of claim 17, further comprising:
(a2iB) obtains as the result sets from a test run of the selected stored procedure.

19. The medium of claim 17, further comprising;
(a2iB) receives a manual definition of the result sets for the selected stored procedure.

20. The medium of claim 15, wherein the obtains instruction (a3) comprises:
(a3i) obtains a definition of the XML document, wherein the definition comprises parameters and result sets for the selected stored procedure to include in the XML document.

21. The medium of claim 20, wherein the obtains instruction (a3i) comprises:
(a3iA) receives a selection of parameters to include in the XML document; and
(a3iB) receives a selection of result sets to include in the XML document.

22. The medium of claim 21, further comprising:
(a3iC) receives a choice of whether multiple result sets are to be merged into one XML document.

23. The medium of claim 21, further comprising:
(a3iC) receives a marking of multiple result sets to be aggregated using primary and foreign key columns of the multiple result sets.

24. The medium of claim 21, further comprising:
(a3iC) receives a marking of a column in the selected result set for aggregation.

25. The medium of claim 15, further comprising:
(c) creating a user defined function to reside on a database server for transforming the defined XML document to another data format.

26. The medium of claim 25, wherein the another data format comprises another XML document.

27. The medium of claim 15, wherein the wrapper converts output data from the selected stored procedure to a data structure comprising nested arrays of a structure, wherein the wrapper converts the data structure to the defined XML document.

28. The medium of claim 27, wherein the data structure comprises nested arrays of objects.

* * * * *